United States Patent
Baskaran et al.

(10) Patent No.: US 10,936,569 B1
(45) Date of Patent: Mar. 2, 2021

(54) EFFICIENT AND SCALABLE COMPUTATIONS WITH SPARSE TENSORS

(71) Applicant: Reservoir Labs, Inc., New York, NY (US)

(72) Inventors: Muthu Manikandan Baskaran, Bayonne, NJ (US); Richard A. Lethin, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 773 days.

(21) Appl. No.: 13/898,159

(22) Filed: May 20, 2013

Related U.S. Application Data

(60) Provisional application No. 61/648,848, filed on May 18, 2012.

(51) Int. Cl.
*G06F 16/00* (2019.01)
*G06F 16/22* (2019.01)

(52) U.S. Cl.
CPC .................. *G06F 16/2264* (2019.01)

(58) Field of Classification Search
CPC ......... G06F 17/30439; G06F 17/30595; G06F 17/30454
USPC ........................................................ 707/714
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A | 4/1998 | Balasa et al. | |
| 5,920,854 A | 7/1999 | Kirsch et al. | |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |
| 6,134,574 A * | 10/2000 | Oberman .................. | G06F 7/53 708/497 |
| 6,279,113 B1 | 8/2001 | Vaidya | |

(Continued)

OTHER PUBLICATIONS

Scalable Tensor Decompositions for Multi-aspect Data Mining, Kolda et al., IEEE (Year: 2008).*

(Continued)

*Primary Examiner* — Jean M Corrielus

(74) *Attorney, Agent, or Firm* — Goodwin Procter LLP

(57) ABSTRACT

In a system for storing in memory a tensor that includes at least three modes, elements of the tensor are stored in a mode-based order for improving locality of references when the elements are accessed during an operation on the tensor. To facilitate efficient data reuse in a tensor transform that includes several iterations, on a tensor that includes at least three modes, a system performs a first iteration that includes a first operation on the tensor to obtain a first intermediate result, and the first intermediate result includes a first intermediate-tensor. The first intermediate result is stored in memory, and a second iteration is performed in which a second operation on the first intermediate result accessed from the memory is performed, so as to avoid a third operation, that would be required if the first intermediate result were not accessed from the memory.

36 Claims, 9 Drawing Sheets

(56) References Cited

U.S. PATENT DOCUMENTS

| | | | |
|---|---|---|---|
| 6,327,699 | B1 | 12/2001 | Larus et al. |
| 6,338,057 | B1 | 1/2002 | Weeks |
| 6,442,539 | B1* | 8/2002 | Amundsen .............. G06F 16/284 |
| 6,487,549 | B1* | 11/2002 | Amundsen .......... G06F 16/2462 |
| 6,502,089 | B1* | 12/2002 | Amundsen ........ G06F 16/24528 707/714 |
| 6,507,835 | B1* | 1/2003 | Amundsen ........ G06F 16/24553 |
| 6,564,204 | B1* | 5/2003 | Amundsen .......... G06F 16/2456 707/714 |
| 6,651,246 | B1 | 11/2003 | Archambault et al. |
| 6,745,173 | B1* | 6/2004 | Amundsen .......... G06F 16/2237 |
| 6,754,650 | B2 | 6/2004 | Cho et al. |
| 6,772,415 | B1 | 8/2004 | Danckaert et al. |
| 6,785,677 | B1 | 8/2004 | Fritchman |
| 6,792,546 | B1 | 9/2004 | Shanklin et al. |
| 6,880,087 | B1 | 4/2005 | Carter |
| 6,912,526 | B2 | 6/2005 | Akaboshi |
| 6,952,694 | B2 | 10/2005 | Mathur et al. |
| 6,952,821 | B2 | 10/2005 | Schreiber |
| 7,086,038 | B2 | 8/2006 | Cronquist et al. |
| 7,185,327 | B2 | 2/2007 | Scales |
| 7,225,188 | B1 | 5/2007 | Gai et al. |
| 7,260,558 | B1 | 8/2007 | Cheng et al. |
| 7,594,260 | B2 | 9/2009 | Porras et al. |
| 7,634,566 | B2 | 12/2009 | Turner et al. |
| 7,757,222 | B2 | 7/2010 | Liao et al. |
| 8,087,010 | B2 | 12/2011 | Eichenberger et al. |
| 8,108,845 | B2 | 1/2012 | Little et al. |
| 8,204,988 | B2* | 6/2012 | Lin ..................... G06K 9/00677 709/220 |
| 8,230,408 | B2 | 7/2012 | Eng |
| 8,250,550 | B2 | 8/2012 | Luszczek et al. |
| 8,255,890 | B2 | 8/2012 | Luszczek et al. |
| 8,307,347 | B2 | 11/2012 | Austin et al. |
| 8,346,708 | B2* | 1/2013 | Chi ........................ G06Q 30/02 706/52 |
| 8,904,152 | B2* | 12/2014 | Pitsianis ............. G06F 9/30032 710/2 |
| 9,471,377 | B2* | 10/2016 | Baskaran .............. G06F 9/4881 |
| 2002/0021838 | A1 | 2/2002 | Richardson et al. |
| 2003/0097652 | A1 | 5/2003 | Roediger et al. |
| 2004/0034754 | A1 | 2/2004 | Schreiber |
| 2004/0068501 | A1 | 4/2004 | McGoveran |
| 2005/0114700 | A1 | 5/2005 | Barrie et al. |
| 2006/0048121 | A1 | 3/2006 | Blainey et al. |
| 2006/0048123 | A1 | 3/2006 | Martin |
| 2006/0085858 | A1 | 4/2006 | Noel et al. |
| 2006/0224547 | A1* | 10/2006 | Ulyanov .............. G06N 99/002 706/62 |
| 2007/0033367 | A1 | 2/2007 | Sakarda et al. |
| 2007/0074195 | A1 | 3/2007 | Liao et al. |
| 2007/0192861 | A1 | 8/2007 | Varghese et al. |
| 2008/0010680 | A1 | 1/2008 | Cao et al. |
| 2009/0037889 | A1 | 2/2009 | Li et al. |
| 2009/0083724 | A1 | 3/2009 | Eichenberger et al. |
| 2009/0119677 | A1 | 5/2009 | Stefansson et al. |
| 2009/0259997 | A1 | 10/2009 | Grover et al. |
| 2009/0307673 | A1 | 12/2009 | Eichenberger et al. |
| 2010/0050164 | A1 | 2/2010 | Van De Waerdt et al. |
| 2010/0158578 | A1* | 6/2010 | Kojima .............. G03G 15/0818 399/276 |
| 2010/0162225 | A1 | 6/2010 | Huang et al. |
| 2010/0185578 | A1* | 7/2010 | Chi ........................ G06Q 30/02 706/52 |
| 2010/0312797 | A1* | 12/2010 | Peng ................. G06F 17/30011 707/776 |
| 2011/0055379 | A1* | 3/2011 | Lin ..................... G06K 9/00677 709/224 |
| 2015/0169369 | A1* | 6/2015 | Baskaran .............. G06F 9/4881 718/102 |

OTHER PUBLICATIONS

Online CP Decomposition for Sparse Tensors, Zhou et al., (Year: 2012).*
Efficient and scalable computations with sparse tensors, Baskaran et al., , IEEE (Year: 2012).*
Memory-efficient parallel tensor decompositions, Muthu et al., IEEE (Year: 2017).*
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 2001, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, Dec. 2007, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Proc. SPIE 7709, Cyber Security, Situation Management, and Impact Assessment II; and Visual Analytics for Homeland Defense and Security II, 770909 (Apr. 28, 2010), 8 pgs.
Ahmed et al, Synthesizing Transformations for Locality Enhancement of Imperfectly-nested Loops Nests, ACM ICS 2000, 141-152.
Ahmed et al, Tiling Imperfectly-nested Loop Nests, IEEE 2000, 14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, An Overview of the SUIF2 Compiler Infrastructure, Computer Systems Laboratory, Stanford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.

(56) References Cited

OTHER PUBLICATIONS

Allen et al, Conversion of Control Dependence to Data Dependence, ACM 1983, pp. 177-189.
Aloul et al, Solution and Optimization of Systems of Pseudo-Boolean Consraints, IEEE Transactions on Computers, vol. 56, No. 10, Oct. 2007, pp. 1415-1424.
Ancourt et al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model Is Easier Than You Think, Proceedings of the 13th International Conference on Parallel Architecture and Compilation Techniques, 2004.
Bastoul, Efficient Code Generation far Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Practical and Fully Automatic Polyhedral Program Optimization System,OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Buluc et al, Parallel Sparse Matrix-Matrix Multiplication and Indexing: Implementation and Experiments, SIAM Journal of Scientific Computing (SISC), 2012.
Burger et al, Scaling to the End of the Silicon with EDGE Architectures, Computer, Jul. 2004, pp. 44-55.
Burke et al, Flow-insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.

Chang et al, Parallel sparse supports for array intrinsic functions of Fortran 90, J. Supercomput. 18(3):305-339, (2001).
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
ClearSpeed—Accelerator Technology Primer, ClearSpeed Technology Primer, ClearSpeed Technology, Inc., 2006.
ClearSpeed—ClearSpeed Programming Model: An introduction, ClearSpeed Technology Inc. 2007.
ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleration, Powerpoint presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.
ClearSpeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997, http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and the Control Dependence Graph, Mar. 7, 1991, pp. 1-52.
Darte et al, Automatic paraltelization based an multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.

(56) References Cited

OTHER PUBLICATIONS

Darte et al, Scheduling and Automatic Parallelization, Chapter 5: Parallelelism Detection in Nested Loops, Birkhauser Boston, 2000, pp. 193-226.
Davis, Direct Methods for Sparse Linear Systems. SIAM, 2006 (100 pgs.).
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh, 2001.
Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau, 2002.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Technical Report MIP-0009, Fakultät für Mathematik und Informatik, Universität Passau, Germany, 2000.
Gu et al, Symbolic Array Dataflow Analysis for Array Privatization and Program Parallelization, Proceedings of Supercomputing '95, pp. 1-19, 1995.
Gundersen et al, Sparsity in higher order methods for unconstrained optimization, Optimization Methods and Software, 27(2):275-294 (2012).
Gustafson et al, ClearSpeed—Whitepaper: Accelerating the Intel® Math Kernel Library, ClearSpeed Technology Inc., 2006.
Gustavson, Two Fast Algorithms for Sparse Matrices: Multiplication and Permuted Transposition, ACM Transactions on Mathematical Software, 4(3): 250-269, 1978.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Jan. 6, 2009 for PCT Application No. PCT/US2007/72260.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Preliminary Report on Patentability dated Nov. 1, 2011 for PCT Application No. PCT/US2010/033049.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, Accessed 2007, pp. 1-61.
Jimenez et al, Register Tiling in Nonrectangular Iteration Spaces, ACM Transactions on Programming Languages and Systems, vol. 24, No. 4, pp. 409-453, Jul. 2002.
Jonsson et al., Verifying Safety Properties of a Class of infinite-State Distributed Algorithms, Lecture Notes in Computer Science, 1995, vol. 939, pp. 42-53.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Kolda et al, Scalable Tensor Decompositions for Multiaspect Data Mining, in ICDM 2008: Proceedings of the 8th IEEE International Conference on Data Mining, Dec. 2008, pp. 363-372.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Lathauwer et al, On the Best Rank-1 and Rank-(R1,R2, . . . ,RN) Approximation of Higher-Order Tensors, SIAM J. Matrix Anal. Appl., 21:1324-1342, Mar. 2000.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2006, 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyhedral Mapper, XPCA Review, Feb. 6, 2007.

(56) References Cited

OTHER PUBLICATIONS

Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Lin et al, Efficient data compression methods for multidimensional sparse array operations based on the EKMR scheme, IEEE Trans. Comput., 52(12):1640-1646, (2003).
Lin et al, Efficient Representation Scheme for Multidimensional Array Operations, IEEE Transactions on Computers, 51:327-345, 2002.
Loechner et al, Precise Data Locality Optimization of Nested Loops, The Journal of Supercomputing, 21, pp. 37-76, 2002.
Mahajan et al., Zchaff2004: An Efficient SAT Solver, LNCS, 2005, pp. 360-375.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.

The Cell Roadmap, Published on PPCNUX at http://www.ppcnux.com/?q=print/6666, Accessed 2006.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, Mar. 2009, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Vera et al, An Accurate Cost Model for Guiding Data Locality Transformations—Politecnica de Catalunya-Barcelona University—Sep. 2005.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.
Wolf et al, A Data Locality Optimizing Algorithm, Proceedings of the ACM SIGPLAN '91 Conference on Programming Language Design and Implementation, Jun. 26-28, 1991, pp. 30-44.
Wu et al, Static Branch Frequency and Program Profile Analysis, 27th IEEE/ACM International Symposium on Microarchitecture (MICRO-27), 1994, 11 pgs.
Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.
Xue, On Tiling as a Loop Transformation, Department of Mathematics, Statistics and Computing Science, University of New England, Australia, 1997, 15 pgs.

\* cited by examiner

Tensor: Y: 4 x 4 x 3 x 4

Original Tensor

| mode: | 1 | 2 | 3 | 4 | | | | | | | | | |
|---|---|---|---|---|---|---|---|---|---|---|---|---|---|
| | 1 | 1 | 1 | 4 | 14 | | | | | | | | |
| | 1 | 1 | 2 | 4 | 7 | | | | | | | | |
| | 1 | 1 | 3 | 4 | 9 | | | | | | | | |
| | 2 | 2 | 1 | 4 | 23 | | | | | | | | |
| | 2 | 2 | 2 | 4 | 38 | | | | | | | | |
| | 2 | 2 | 3 | 4 | 44 | | | | | | | | |
| | 3 | 4 | 1 | 3 | 9 | | | | | | | | |
| | 3 | 4 | 2 | 3 | 9 | | | | | | | | |
| | 3 | 4 | 3 | 3 | 18 | | | | | | | | |
| | 2 | 3 | 1 | 1 | 49 | | | | | | | | |
| | 2 | 3 | 2 | 1 | 28 | | | | | | | | |
| | 2 | 3 | 3 | 1 | 35 | | | | | | | | |

Tensor rearranged to enumerate fiber-index-tuples of mode 3

S:
| 1 | 1 | 4 |
| 1 | 2 | 4 |
| 3 | 4 | 3 |
| 2 | 3 | 1 |

202

| 1 | 2 | 3 | 1 | 2 | 3 | 1 | 2 | 3 | 1 | 2 | 3 |
|---|---|---|---|---|---|---|---|---|---|---|---|
| 14 | 7 | 9 | 23 | 38 | 44 | 9 | 9 | 18 | 49 | 28 | 35 |

S : fiber-index-tuples of mode 3 of the sparse tensor

Mode 3 takes values {1,2,3}

For each fiber-index-tuple, there exists a non-zero for each index (1, 2 or 3) of mode 3.

Mode 3 is hence dense.

Modes 1, 2, and 4 are sparse.

FIG. 2B

Tensor : Y : 4 × 4 × 3 × 4

Co-ordinate Sparse Tensor Format:

| 1 | 1 | 1 | 1 | 1 | 1 | 3 | 3 | 3 | 2 | 2 | 2 |
| 1 | 1 | 1 | 2 | 2 | 2 | 4 | 4 | 4 | 3 | 3 | 3 |
| 1 | 2 | 3 | 1 | 2 | 3 | 1 | 2 | 3 | 1 | 2 | 3 |
| 4 | 4 | 4 | 4 | 4 | 4 | 3 | 3 | 3 | 1 | 1 | 1 |
| 14 | 7 | 9 | 23 | 38 | 44 | 9 | 9 | 18 | 49 | 28 | 35 |

FIG. 4A
(PRIOR ART)

Mode-generic Sparse Tensor Format:

Mode-specific Sparse Tensor Format (candidate mode = 2):

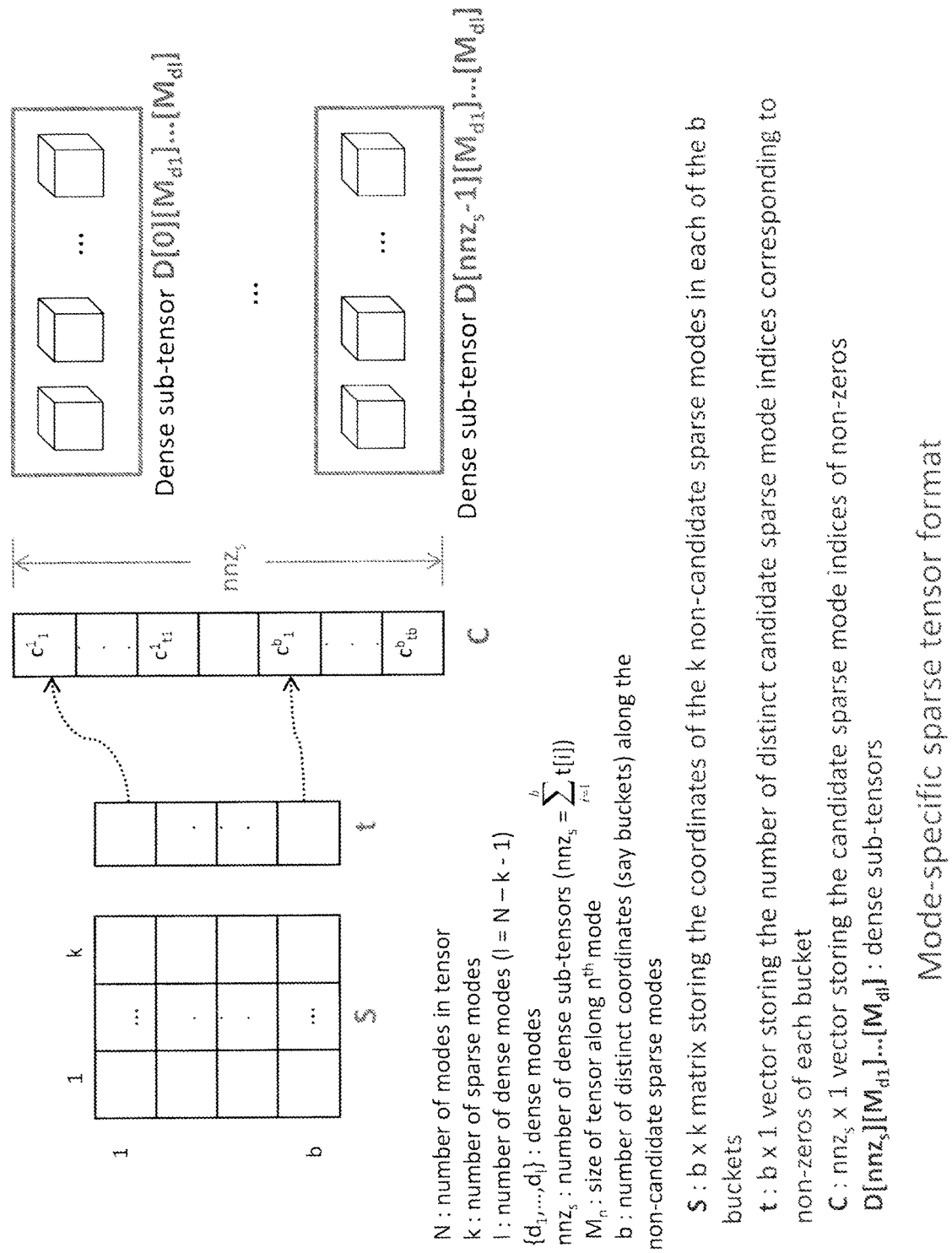

EFFICIENT AND SCALABLE COMPUTATIONS WITH SPARSE TENSORS

CROSS REFERENCE TO RELATED APPLICATIONS

This application is related to and claims the benefit of priority to U.S. Provisional Patent Application Ser. No. 61/648,848 filed on May 18, 2012, the entirety of which is hereby incorporated by reference.

GOVERNMENT INTERESTS

Portions of this invention were made with U.S. Government support under contract/instrument Department of Defense SBIR H98230-12-C-0229. The U.S. Government has certain rights in the invention.

FIELD OF THE INVENTION

The present invention generally concerns computations with data. More particularly, the invention concerns a system, methods, and apparatus for performing memory-efficient operations on large scale data.

BACKGROUND OF THE INVENTION

Using linear algebraic techniques to find structures and properties of data in data analytics applications is well established. For example, application of linear algebraic formulations for solving graph analysis problems is known. These linear techniques are applicable only to two-dimensional data and require the data to be represented in terms of matrices. However real-world data are often multi-dimensional with multiple attributes. Tensors or multi-dimensional arrays are a natural fit to represent data with multiple attributes and dimensionality. In order to perform operations on tensors, multi-linear algebra, a generalization of linear algebra to higher dimensions, is increasingly used in real-world applications for extracting and explaining the properties of multi-attribute data. Multi-linear algebraic computations or tensor computations such as tensor factorizations or decompositions have applications in a range of domains such as signal processing, data mining, computer vision, numerical linear algebra, numerical analysis, graph analysis, cyber security, and quantum chemistry.

Two of the prominent tensor decompositions are CAN-DECOMP/PARAFAC (CP) and Tucker decompositions. These decompositions are popular in scientific domains and also in modern applications such as social network analysis, network traffic analysis and web search mining.

The CP decomposition decomposes a tensor into a sum of component rank-one tensors (A N-way tensor is called a rank-one tensor if it can be expressed as an outer product of N vectors). The CP decomposition that factorizes an input tensor X of size $I_1 \times \ldots \times I_N$ into R components (with factor matrices $A^{(1)} \ldots A^{(N)}$ and weight vector $\lambda$) is of the form:

$$X = \sum_{r=1}^{R} \lambda_r a_r^{(1)} \ldots a_r^{(N)}$$

where $a_r^{(n)}$ is the r-th column of the factor matrix $A^{(n)}$ of size $I_n \times R$.

The Tucker decomposition decomposes a tensor into a core tensor multiplied by a matrix along each mode. The Tucker decomposition that factorizes an input tensor X of size $I_1 \times \ldots \times I_N$ into a core tensor G of size $R_1 \times \ldots \times R_N$ and factor matrices $A^{(1)} \ldots A^{(N)}$ (where each factor matrix $A^{(n)}$ is of size $I_n \times R_n$) is of the form:

$$X \approx G x_1 A^{(1)} x_2 \ldots x_N A^{(N)}$$

A widely used algorithm for computing Tucker decomposition is the higher-order orthogonal iteration (HOOI) method (L. D. Lathauwer, B. D. Moor, and J. Vandewalle, "On the Best Rank-1 and Rank-(R1, R2, ..., RN) Approximation of Higher-Order Tensors," SIAM J. Matrix Anal. Appl., vol. 21, pp. 1324-1342, March 2000).

An embodiment of the HOOI algorithm/method is presented in FIG. 6. The HOOI method involves various basic computational kernels that include SVD and n-Mode matrix product. An important tensor operation that is widely used in multi-linear algebra arithmetic is the n-Mode matrix product. The n-Mode matrix product of a tensor X of size $I_1 \times \ldots \times I_N$ with a matrix A of size $J \times I_n$ (denoted by $X \times_n A$) results in a tensor of size $I_1 \times \ldots \times I_{n-1} \times J \times I_{n+1} \times \ldots \times I_N$ such that $(i_1 \ldots i_{n-1} j i_{n+1} \ldots i_N)$th element of $(X \times_n A)$ is given by $$\sum_{in=1}^{In} x_{i1 \ldots iN} a_{jin}.$$

A major challenge in real-world applications is handling the sparsity of data, as real-world data are not only multi-dimensional but also such that linkages between multiple attributes of data have a sparse characteristic. Sparse linear algebra primitives are widely used for two-dimensional data analysis and techniques for optimizing and parallelizing key sparse linear algebraic primitives such as sparse matrix vector multiply, sparse matrix multiply and the like have been studied extensively and are available in literature (See, e.g., F. G. Gustavson, "Two Fast Algorithms for Sparse Matrices: Multiplication and Permuted Transposition," ACM Transactions on Mathematical Software, vol. 4, no. 3, pp. 250-269, 1978; T. A. Davis, Ed., Direct Methods for Sparse Linear Systems. SIAM, 2006; and A. Buluc and J. R. Gilbert, "Parallel Sparse Matrix-Matrix Multiplication and Indexing: Implementation and Experiments," SIAM Journal of Scientific Computing (SISC), 2012). However, for performance and storage reasons, it is not efficient to use any existing sparse matrix format to store sparse tensors and apply sparse matrix primitives to solve sparse tensor problems. In other words, using sparse matrix formats to store sparse tensors typically requires a large amount of memory. Performing operations on sparse tensors using sparse matrix formats can result in significant performance penalty, in part, due to the time consumed in accessing various data elements of the sparse tensor.

A common or natural form of representing a sparse tensor is the coordinate sparse tensor format in which each non-zero is stored along with its index. FIG. 1. illustrates the coordinate sparse tensor format. A common storage scheme for storing sparse matrices is the Compressed Row Storage (CRS) format or the Compressed Column Storage (CCS) format. Sparse tensors are sometimes "flattened" or "matricized" and stored in the CRS or CCS format. There are few other tensor storage formats such as the Extended Karnaugh Map Representation (EKMR) format and its compressed sparse versions, namely, the Extended CRS (ECRS) and the Extended (ECCS) formats (See, e.g., C.-Y. Lin, J.-S. Liu, and Y.-C. Chung, "Efficient Representation Scheme for Multidimensional Array Operations," IEEE Transactions on Computers, vol. 51, pp. 327-345, 2002; and C.-Y. Lin, Y.-C. Chung, and J.-S. Liu, "Efficient data compression methods for multidimensional sparse array operations based on the EKMR scheme," IEEE Trans. Comput. 52(12) (2003), pp. 1640-1646). These formats do not account for tensor properties, and also, in using these formats the tensor operation needs to be restructured as a matrix operation. Therefore, these formats do not provide the benefits of viewing the tensor as a higher than two dimensional array and performing tensor operations. Some sparse tensor storage formats are specialized to specific sparsity patterns such as patterns in symmetric or super-symmetric sparse tensors. (See e.g. Geir Gundersen and Trond Steihaug, "Sparsity in higher order methods for unconstrained optimization," Optimization Methods and Software 27(2):275-294 (2012)). These and other sparse tensor storage formats (see e.g. R.-G. Chang, T.-R. Chuang, and J. K. Lee, "Parallel sparse supports for array intrinsic functions of Fortran 90," J. Supercomput. 18(3) (2001), pp. 305-339), do not account for tensor properties, and do not support efficient storage of dense sub-tensors, e.g., those present within a sparse tensor.

Another major challenge in real-world applications is that the data that these applications process are usually large and the large size of the data poses a significant challenge to the efficiency of the computations performed with the data. Large-scale data also poses a threat of "blowing up" system memory during computation resulting in inability to finish the computation.

The coordinate sparse tensor format and other known formats for storing a tensor are known to be inefficient or even inadequate while performing computations on large data sets requiring large tensors, e.g., tensors storing tens or hundreds of millions of values. In this context, inadequate generally means that in some instances the memory/storage requirement according to the format used to store the tensor or partial results that are tensors becomes so large that a computer/server/multi-processor system used to perform operations on the data runs out of memory, preventing completion of the task. This is often described as memory blowup.

Memory blowup problem is a phenomenon commonly observed by users in Tucker decomposition—a commonly used procedure in several tensor based large-data computations. Handling memory consumption in large-scale tensor computations is very important not only for preventing potential memory overflows but also for improving the overall execution time. Some techniques that address the memory blowup problem, particularly in Tucker decomposition and/or n-Mode matrix product, also cannot enable computers to efficiently complete the large-data analysis tasks in several instances. Accordingly, there is need for improved methods and systems for performing computations on tensors.

SUMMARY OF THE INVENTION

The present invention presents various embodiments for addressing the aforementioned major challenges in computations involving sparse tensor or multi-dimensional array data. In one embodiment, new sparse tensor storage formats that provide memory storage benefits and performance benefits while executing sparse tensor computations are presented. One format is called "mode-generic" sparse tensor format that is a generic representation of tensor to conveniently store sparse and semi-sparse tensors. Another format is called "mode-specific" sparse format that is a special form of the generic representation that is suitable for performing computations along a specific mode or dimension of the tensor. These new sparse tensor storage formats may not only store the tensor data using less memory than the conventional techniques, but also arrange the data in the memory in such a manner that the data elements likely to be accessed frequently during a certain time period, or while computing a portion of a large computation, are stored relatively close to each other in the memory, so as to improve data locality in sparse tensor computations and to reduce unnecessary memory storage in the process of large data computations.

In another embodiment, a novel optimization that aims to improve data reuse and reduce redundant or unnecessary computations in a sequence of tensor operations (e.g., in Tucker decomposition) is presented. It should be understood that Tucker decomposition is only an example of tensor computation. Various embodiments described herein can be used to improve performance and/or memory usage of several types of tensor operations such as those involving matrix operations on a tensor. In various embodiments, data reuse optimization technique reuses previously computed data and avoids redundant computation in a sequence of tensor operations.

In yet another embodiment, a memory-efficient scalable technique to handle large-scale sparse tensor computations is presented. The technique couples the data reuse optimization and the advantage of our sparse tensor formats to store semi-sparse tensors to arrive at a memory-efficient scalable solution to address the memory blowup challenges in large sparse tensor computations. The technique, in addition to addressing the memory blowup issues, can also help speed up the execution of the computations.

Accordingly, in one aspect, various embodiments feature an article of manufacture that includes instructions to configure a processor, a method, and/or a system that enables efficiently storing a tensor. The tensor includes at least three modes, and the system includes a memory, and a processor in electronic communication with the memory. The processor is configured according to the system configuration, or by the instructions included in the article of manufacture, and the method is provided to store in the memory elements of the tensor in a mode-based order for improving locality of references when the elements are accessed during an operation on the tensor. The memory can be local to the processor, or may be remote thereto. The memory may also be shared and/or distributed memory. The memory includes volatile memory such as RAM, and non-volatile memory such as a disk, CD, etc. The processor includes any computing device, such as desktops, laptops, hand-held, mobile computing devices, and servers. The processor also includes multi-processor and/or multi-core systems.

In some embodiments, the method is provided, and the processor included in the system, or configured by the instructions on the article of manufacture is further configured, to store in the memory a first data structure that includes one or more sparse mode index tuples associated with the tensor. The method and the processor are also adapted to store a second data structure that includes a number of significant values in the tensor. Each significant value, e.g., a "non-zero" value, corresponding to a sparse mode index tuple in the first data structure. The first data structure may include a matrix having b rows, b being a number of sparse mode index tuples in the plurality of sparse mode index tuples. Each row of the matrix may include a unique sparse mode index tuple. The matrix may also include k columns, each column corresponding to a sparse mode. The second data structure may include a sub-tensor.

In some embodiments, the method is provided, and the processor included in the system, or configured by the instructions on the article of manufacture is further configured, to store in the memory elements of the sub-tensor in a mode-based order for improving locality of references when the elements of the sub-tensor are accessed during an operation on the sub-tensor. The processor included in the system, or configured by the instructions on the article of manufacture and/or the method, may be further configured to identify a set of sparse modes of a tensor, and a subset of sparse modes from the set of sparse modes. The identified subset may include one of more sparse mode index tuples.

In some embodiments, the set of sparse modes includes each sparse mode of the tensor, and the subset of sparse modes is same as the set of sparse modes, i.e., each sparse mode of the tensor is included in the subset. Moreover, the tensor may include one or more dense modes. The processor included in the system, or configured by the instructions on the article of manufacture and/or the method, may be further configured to select a candidate sparse mode from the set of sparse modes. In identifying the subset of sparse modes, the candidate sparse mode selected from the set of sparse modes may be excluded from the subset, and each tuple in the several sparse-mode index tuples excludes indices of the candidate sparse mode. The tensor may lack (not have) a dense mode, i.e., all modes are determined to be sparse.

In some embodiments, the processor included in the system, or configured by the instructions on the article of manufacture and/or the method, are further configured to store a third data structure C, that includes indices in the selected candidate sparse mode. Each index in the third data structure C may be associated with a significant value in the tensor. A fourth data structure t, including a cell corresponding to each sparse mode index tuple in the first data structure may also be stored. Each cell may represent a number of indices in the selected candidate sparse mode that are associated with a tuple corresponding to that cell. The third data structure C, the fourth data structure t, or both may include or be formed as an array or a vector.

In another aspect, various embodiments feature an article of manufacture that includes instructions to configure a processor, a method, and/or a system that facilitate data reuse in a tensor transform. The tensor has at least three modes, and the tensor transform includes a number of iterations. The system includes a memory and a processor in electronic communication with the memory. Each of the memory and the processor include various types of storage devices and computing devices, respectively, as described above. The processor included in the system, or configured by the instructions on the article of manufacture and/or the method, is configured to perform a first iteration that includes a first operation (e.g., an n-Mode matrix product) on the tensor to obtain a first intermediate result. The first intermediate result includes a first intermediate-tensor. The first intermediate result is stored in the memory, and the processor is configured to perform a second iteration that includes a second operation on the first intermediate result accessed from the memory. Because the second operation is performed on the intermediate result accessed from the memory, a third operation is avoided. For a required computation involving the tensor, the third operation is required if the first intermediate result is not accessed from the memory.

The second operation may use an operand computed during the first iteration. The operand may include a matrix. The first operation, the second operation, or both, may include an n-Mode product. Other matrix operations may also form the first and/or second operation. Each iteration in the several iterations in the transform may include a sequence of operations, and the processor included in the system, or configured by the instructions on the article of manufacture and/or the method, may be further configured to order the sequence of operations in each iteration according to an increasing order or a decreasing order of modes of the tensor.

In some embodiments, each iteration in the several iterations in the transform includes a sequence of operations, and the processor included in the system, or configured by the instructions on the article of manufacture and/or the method, is further configured to order the sequence of operations in each iteration in a first set of iterations from the several iterations according to an increasing order of modes of the tensor. The sequence of operations in each iteration in a second set of iterations in the several iterations is ordered according to a decreasing order of modes of the tensor.

The processor included in the system, or configured by the instructions on the article of manufacture and/or the method, is further configured to store in the memory, elements of the first intermediate tensor in a mode-based order for improving locality of references when the elements of the intermediate tensor are accessed during an operation thereon. To store the elements of the first intermediate tensor in the mode-based order, the processor included in the system, or configured by the instructions on the article of manufacture and/or the method, may be further configured to store in the memory a first data structure that includes a number of sparse mode index tuples associated with the first intermediate tensor. A second data structure that includes a number of significant values in the first intermediate tensor may also be stored. Each significant value may correspond to a sparse mode index tuple in the first data structure.

In some embodiments, the processor included in the system, or configured by the instructions on the article of manufacture and/or the method, is further configured to identify a set of reusable tensors to be computed during a plurality of iterations. The processor may also evaluate, for each reusable tensor in the set, a memory storage requirement, and may select a subset of reusable tensors from the set such that a total memory storage memory requirement for all of the reusable tensors in the subset does not exceed a preselected threshold. The preselected threshold can be size of the memory accessible to the processor.

In some embodiments, the set of reusable tensors comprises all reusable tensors to be computed during the plurality of iterations. To evaluate the memory storage requirement for each reusable tensor in the set, the processor included in the system, or configured by the instructions on the article of manufacture and/or the method, may be further configured to determine a degree of reuse of the reusable tensor. The selection may be further based on, at least in part, the degree of reuse of each reusable tensor in the set.

In some embodiments, one or more iterations in the several iterations in the transform include a sequence of operations. Each operation may correspond to a mode of the tensor, and the processor included in the system, or configured by the instructions on the article of manufacture and/or the method, may be further configured to perform a first group of operations in element-wise mode, and perform a second mode of operation in standard mode. To evaluate the memory storage requirement for each reusable tensor, the processor included in the system, or configured by the instructions on the article of manufacture and/or the method may be further configured to determine a memory size required to store the reusable tensor by storing in the memory elements of the reusable tensor in a mode-based order for improving locality of references when the elements of the reusable tensor are accessed during an operation on the reusable tensor.

BRIEF DESCRIPTION OF THE DRAWINGS

Various embodiments of the present invention taught herein are illustrated by way of example, and not by way of limitation, in the figures of the accompanying drawings, in which:

FIG. 2A depicts an exemplary sparse tensor and storage thereof using the conventional co-ordinate sparse tensor formal, and FIG. 2B illustrates a classification of dense and sparse modes, according to one embodiment;

FIGS. 4A-4C present an exemplary sparse tensor represented in three sparse tensor storage formats: the conventional coordinate format (shown in FIG. 4A), a mode-generic format according to one embodiment (shown in FIG. 4B), and a mode-specific format, according to one embodiment (shown in FIG. 4C);

FIG. 5 illustrates the representation of a sparse tensor in a mode-specific sparse tensor format, according to one embodiment;

DETAILED DESCRIPTION OF THE INVENTION

Figure 1:
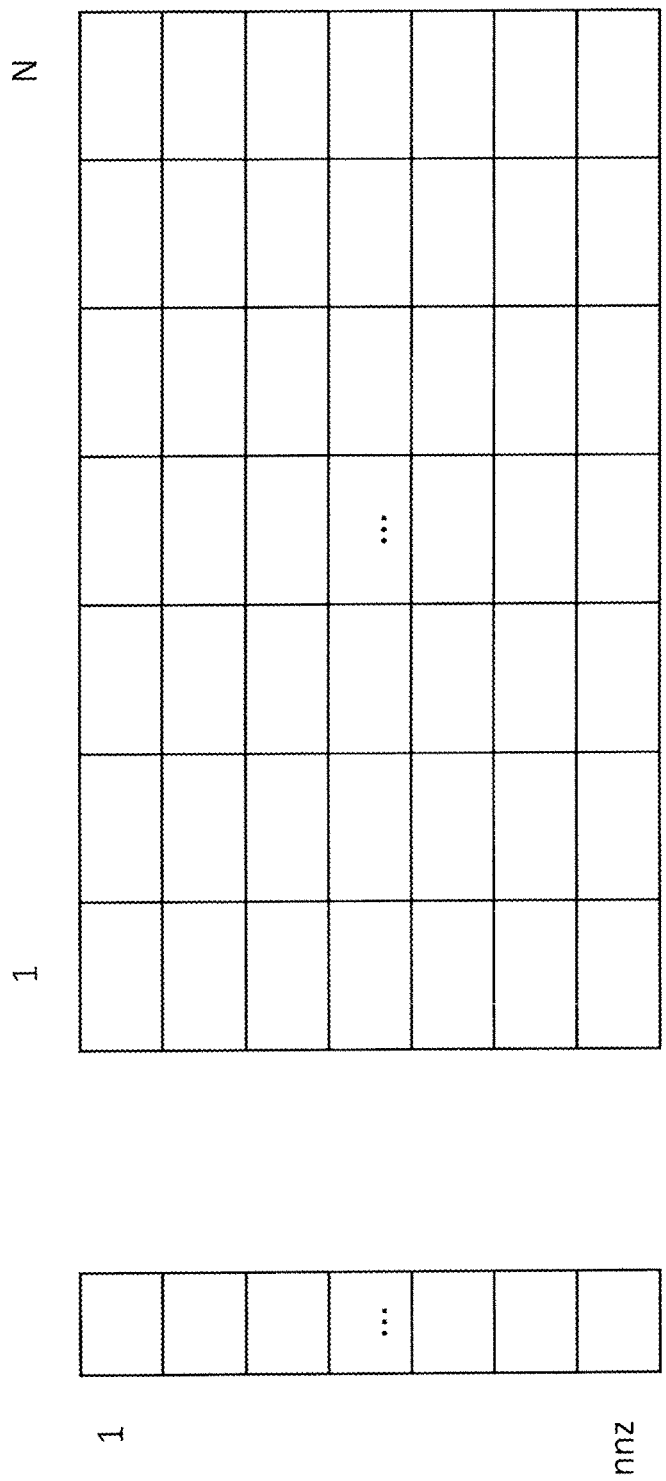
FIG. 1 illustrates the representation of sparse tensors in coordinate sparse tensor format.

Sparse tensors are typically represented in coordinate format (as illustrated in FIG. 1) by explicitly storing the non-zero indices and values of the tensor. If there are P non-zeros for a N mode tensor, the coordinate format stores the indices or subscripts of the P non-zeros in a P×N matrix and the values of the non-zeros in a P×1 vector. The coordinate format is simple and flexible. Further, the computations are not specialized for any ordering of the modes. However, the simplicity and flexibility of the format may be adverse to data locality based on the access pattern of the non-zeros.

When the non-zero values of a sparse tensor are stored not in any specific order of their indices, any tensor operation that is performed along a specific mode (mode-specific operation) would result in very poor locality with respect to accumulating the results of the operation in the output. This is because different non-zeros in the input tensor may contribute to the same element of the output and an arbitrary and/or a random order of the indices may result in accessing the same element in different time instances that are far apart in the execution time-line (resulting in loss of locality). Furthermore, the coordinate format is inefficient in terms of memory storage when the tensor is semi-sparse, i.e., when the tensor has dense sub-tensors.

For any mode-specific operation, it is beneficial in terms of data locality if the storage format supports enumerating the "fibers" (sections of a tensor obtained by fixing indices along all but one mode) corresponding to the mode efficiently. A fiber is generally understood as a higher-order analogue of a matrix row or column. A mode-n fiber may be obtained by fixing the indices along all modes except mode n. For example, for a 3×4×4×5 tensor X, a mode-3 fiber obtained after fixing the indices along modes 1, 2, and 4 to be 2, 3, and 5, respectively, is the vector $[X_{2315}\ X_{2325}\ X_{2335}\ X_{2345}]$.

A motivation behind our new sparse tensor formats is to facilitate the improvement of data locality of the sparse tensor references and to efficiently support the storage of dense sub-tensors within a sparse tensor. To improve data locality and data storage efficiency, in one embodiment we present a mode-generic sparse tensor storage format and in another embodiment we present a mode-specific sparse tensor storage format. In general, the mode-generic format is beneficial for any tensor operation and the mode-specific format is advantageous for mode-specific tensor operations. The mode-specific format can support efficient enumeration of fibers corresponding to a mode. The mode-generic and mode-specific formats take into account that some of the modes of the tensor may be dense (for example, tensors resulting from a sparse tensor dense matrix product) and hence are capable of efficiently representing dense sub-tensors within a sparse tensor.

With reference to FIGS. 2A and 2B we classify modes as dense or sparse as per the following criteria. For any mode n, (e.g., mode 3 of the 4-mode tensor Y) we enumerate the "fiber-index-tuples" 202 of the mode, where fiber-index-tuples are the unique index tuples of the non-zeros of the sparse tensor excluding the indices of mode n (e.g., mode 3 of tensor Y). If for each fiber-index-tuple, there exists a non-zero for each index of mode n (i.e., indices 1, 2, and 3 of mode 3, because the size of mode 3 is 3), then mode n is designated to be completely dense. In the case of tensor Y in FIG. 2A, mode 3 204 is completely dense. If there exists a non-zero for each index of mode n for most of the fiber-index-tuples (say for "q" fiber-index-tuples, where q is less than the total number of fiber-index-mode tuples), then mode n is considered to be mostly dense. The quantitative factor "q" governing the density of a mode can be configured by the user. If a mode is completely or mostly dense, it is considered as dense, otherwise it is considered as sparse.

In some embodiments, "non-zero" is also configured by a user. For example, absolute values less than or equal to a user-specified quantity "e" may be considered to be "zero" and the absolute values greater than "e" (e.g., 0.00001, 0.1, 0.5, 2, etc.) may be considered to be "non-zero." As such, a non-zero value can also be called a significant value. In general, references to operations such as multiply and plus, and values such as zero, and non-zero, for the elements of tensors may be understood to refer to appropriate implementations where these operators and elements correspond to operators, elements, and identity elements generally over algebraic rings, semi-rings, or abelian rings, or their approximations, for example, algebras over integers, rationals, reals, complex numbers, digital floating point representations, and including min-plus algebras over numbers and symbolic operators and strings.

Figure 3:
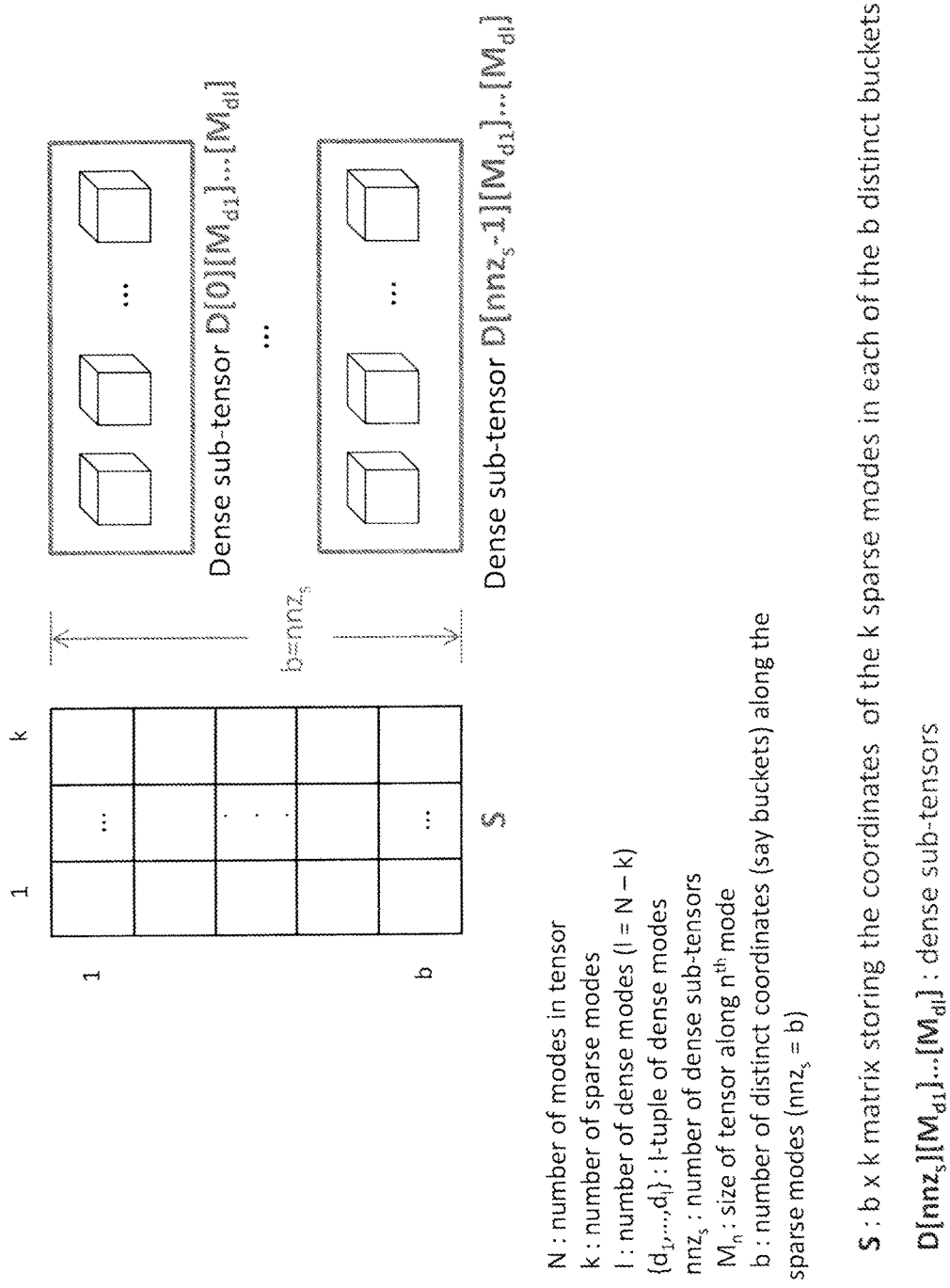
FIG. 3 illustrates the representation of a sparse tensor in a mode-generic sparse tensor format, according to one embodiment.

In one embodiment illustrated with reference to FIG. 3, a tensor may be stored in a mode-generic format as follows:
sparse and dense modes are identified and separated;
thereafter, storage for a N-th order tensor of size $M_1 \times M_2 \times \ldots \times M_N$ is as follows:
1) k: a scalar that stores the number of modes identified as sparse modes,
2) b: a scalar that stores the number of distinct sparse mode index tuples (or buckets),
3) d: a l×1 vector that stores the list of l dense modes (where l=N−k),
4) S: a b×k matrix that stores the coordinates/indices of the k sparse modes in each of the b distinct buckets, such that each bucket stores one distinct sparse mode index tuple, and 5) D: $\begin{cases} ab \times M_{d1} \times M_{d2} \times \ldots \times M_{dl} \text{ array(storing } "b" \\ \text{dense sub-tensors, when } l > 0 \\ ab \times 1 \text{ vector, when } l = 0 \end{cases}$ With reference to FIG. 4B, for the exemplary tensor Y (described with reference to FIG. 2A), k=3 for the mode-generic format, because the tensor Y has three sparse modes—modes 1, 2, and 4. The number of distinct sparse mode index tuples, b, is 4. The number of dense modes is 1, because only mode 3 is determined to be dense. Therefore, the vector d is {3}. A sub-tensor [14, 7, 9] is associated with the first sparse mode index tuple (1, 1, 4). Another sub-tensor [49, 28, 35] is associated with a different sparse mode index tuple (2, 3, 1). Because tensor Y has only one dense mode, the sub-tensors corresponding to the dense mode 3 can be represented in the form of a vector or an array. The tensor Y, however, is illustrative only, and in general a sub-tensor associated with each sparse mode index tuple may have several dense modes.

In one embodiment illustrated with reference to FIG. 5, a tensor may be stored in a mode-specific format as follows:
sparse and dense modes are separated, and one sparse mode is selected as a candidate sparse mode;
thereafter, storage is as follows for a N-th order tensor of size $M_1 \times M_2 \times \ldots \times M_N$ is as follows:
1) c: a scalar that indicates the selected candidate sparse mode,
2) k: a scalar that stores the number of sparse modes excluding the candidate sparse mode,
3) b: a scalar that stores the number of distinct non-candidate sparse mode index tuples (or buckets),
4) d: a l x 1 vector that stores the list of l dense modes (where l=N−k−1),
5) S: a b x k matrix that stores the coordinates/indices of the k non-candidate sparse modes in each of the b distinct buckets, such that each bucket stores one distinct sparse mode index tuple,
6) t: a b×1 vector that stores the number of distinct candidate sparse mode indices corresponding to the non-zero values associated with each bucket,
7) C: a $nnz_s \times 1$ vector that stores the candidate sparse mode indices associated with non-zero values (where $nnz_s = \sum_{i=1}^{b} t[i]$, and 8) D: $\begin{cases} annz_s \times M_{d1} \times M_{d2} \times \ldots \times M_{dl} \text{ array(storing } "nnz_s" \\ \text{dense sub-tensors, when } l > 0 \\ annz_s \times 1 \text{ vector, when } l = 0 \end{cases}$ Recall that the exemplary tensor Y (described with reference to FIG. 2A), has three sparse modes, namely, modes 1, 2, and 4. Referring to FIG. 4C, from these sparse modes the mode 2 is selected as the candidate sparse mode "c." Therefore, in the mode-specific format k=2. The number of distinct sparse mode index tuples, b, is 3, because indices associated with the candidate sparse mode (i.e., mode 2) are excluded. The number of dense modes is 1, because only mode 3 is determined to be dense, similarly as in the mode-generic format. Therefore, the vector d is {3}.

Two indices (1 and 2) of the candidate sparse mode (mode 2) are associated with the index tuple (1, 4) representing indices of sparse modes 1 and 4. One index (4) of the candidate sparse mode (mode 2) is associated with the index tuple (3, 3) representing indices of the sparse mode 1 and 4, and one index (3) of the candidate sparse mode (mode 2) is associated with the index tuple (2, 1) representing indices of the sparse mode 1 and 4. Thus, the vector t corresponding to the tensor Y includes three cells: {2, 1, 1}, and the corresponding vector C is {1, 2, 4, 3}. The first cell in the vector t indicates that the first two values in the vector C (i.e., indices 1 and 2) are associated with the sparse mode index tuple (1, 4). The second and third cells in the vector t, each of which has a value "1" further indicate that each of the remaining sparse mode index tuples corresponds to one value in the vector C.

In the mode-specific format, a sub-tensor [14, 7, 9] is associated with the first sparse mode index tuple (1, 4), and with the first element in the vector C, i.e., the index "1" of the candidate sparse mode (mode 2). A second sub-tensor [23, 38, 44] is also associated with the first sparse mode index tuple (1, 4), but with the second element in the vector C, i.e., the index "2" of the candidate sparse mode (mode 2). Another sub-tensor [49, 28, 35] is associated with a different sparse mode index tuple (2, 1), and with the fourth element in the vector C, i.e., the index "3" of the candidate sparse mode (mode 2). Because tensor Y has only one dense mode, the sub-tensors in D can be represented in the form of a vector or an array. The tensor Y, however, is illustrative only, and in general a sub-tensor associated with each sparse mode index tuple may have several dense modes. Any of these sub-tensors can be efficiently stored by using a mode-based order to store the sub-tensor elements. For example, a mode-generic and/or a mode-specific format can be used to store one or more sub-tensors.

Figure 6:
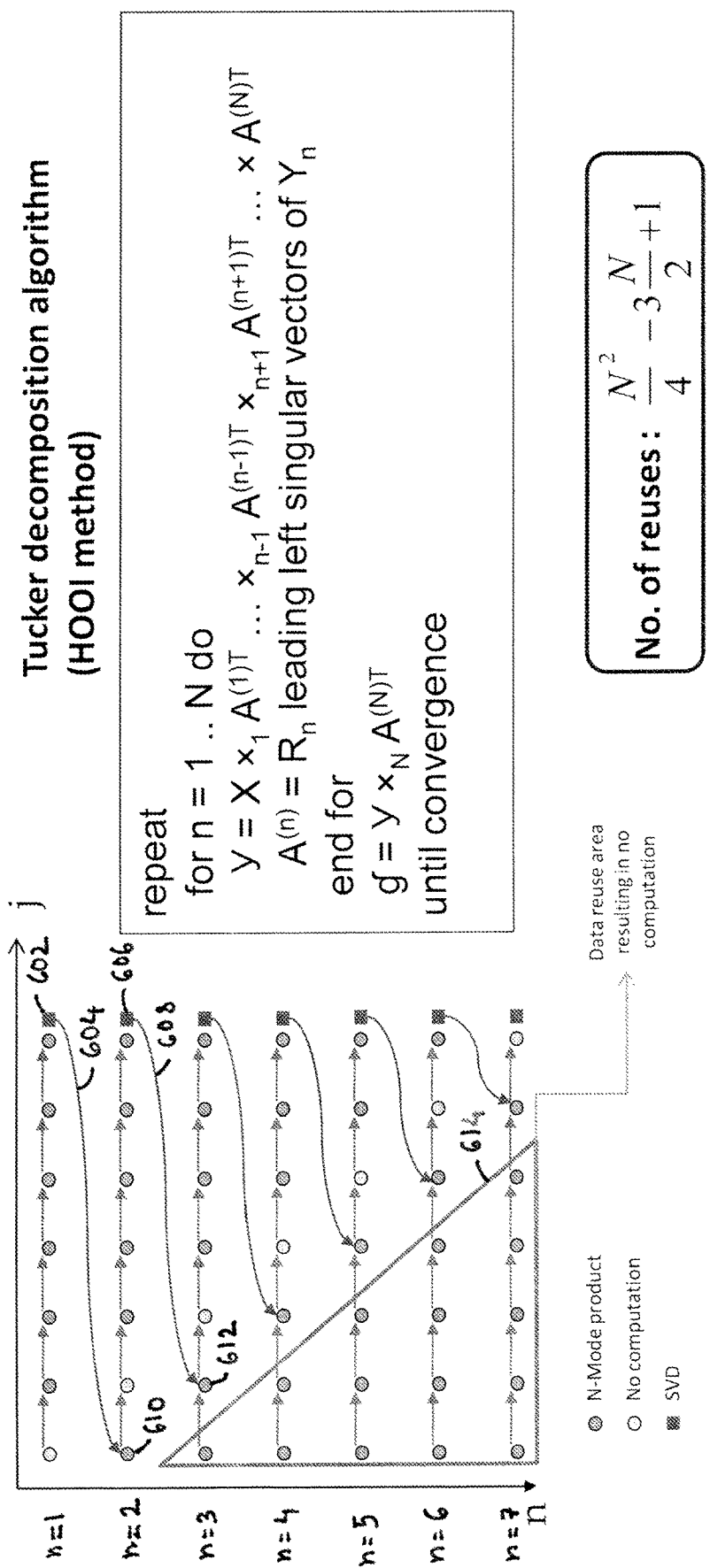
FIG. 6 schematically depicts computations in the original higher-order orthogonal iteration (HOOI) method for computing the Tucker decomposition, and indications of potential data reuse and computation avoidance, according to one embodiment.

With reference to FIG. 6, we present a novel high-level optimization that is designed to avoid unnecessary (and costly) computations and to efficiently reuse previously computed data in Tucker decomposition. An embodiment of the Tucker-HOOI algorithm depicted in FIG. 6 includes a common tensor operation, namely, a sequence of tensor matrix products along all but one modes of a tensor (all but one n-Mode matrix product sequence), which is described as follows:

$$Y = X \, x_1 \, A^{(1)T} \, x_2 \ldots x_{n-1} \, A^{(n-1)T} \, x_{n+1} \, A^{(n+1)T} \ldots x_N \, A^{(N)T}$$

Each $x_n$ in the computation indicates a n-Mode matrix product (multiplying a tensor with a matrix along the nth mode of the tensor). As it can be seen in FIG. 6, there is a sequence of N-1 n-Mode matrix product computations (N being the number of modes of the tensor) within each iteration of the "for" loop. Each product in the sequence produces an intermediate tensor that can be used to compute the next product in the sequence.

A major challenge is to reduce the storage of such intermediate tensors and increase the opportunity to reuse the intermediate data for memory scalability and performance improvement. Some of the intermediate tensors produced within one iteration of the for loop can be reused in subsequent iterations of the for loop. Exploiting such data reuse needs proper scheduling of the operations in the computation.

At iteration n=1, initial values of the matrices $A^{(2)T}, \ldots,$ and $A^{(N)T}$ are used in the computation of "Y." Also in iteration (n=1), an updated value of matrix $A^{(1)T}$ is computed, as indicated at 602. The updated value of $A^{(1)T}$ is used in iteration (n=2) as indicated by arrow 604. The computation in the iteration (n=2) can be described as:

$$Y = X \, x_1 \, A^{(1)T} \, x_3 \, A^{(3)T} \ldots x_N \, A^{(N)T}$$

During this iteration, the matrix $A^{(2)T}$ is updated as shown at 606, for subsequent use in iteration (n=3), as indicated by arrow 608. The computation in the iteration (n=3) can be described as:

$$Y = X \, x_1 \, A^{(1)T} \, x_2 \, A^{(2)T} \, x_4 \, A^{(4)T} \ldots x_N \, A^{(N)T}$$

In the iteration (n=3), instead of re-computing the intermediate tensor $(X \, x_1 \, A^{(1)T})$, the value thereof, previously computed in the iteration (n=2), may be reused. Thus, the computation of Y in the iteration (n=3) may be expressed as:

$$Y = Z \, x_2 \, A^{(2)T} \, x_4 \, A^{(4)T} \ldots x_N \, A^{(N)T}$$

where $Z = (X \, x_1 \, A^{(1)T})$, that was computed, as shown at 610, and stored in the iteration (n=2).

Further reuses of intermediate tensors are possible. For example, the computation in iteration (n=4) can be described as:

$$Y = X \, x_1 \, A^{(1)T} \, x_2 \, A^{(2)T} \, x_3 \, A^{(3)T} \, x_5 \, A^{(5)T} \ldots x_N \, A^{(N)T}$$

In this computation, the intermediate tensor $(X \, x_1 \, A^{(1)T})$, that was computed as shown at 610 in the iteration (n=2) may be reused, or the intermediate tensor $(X \, x_1 \, A^{(1)T} \, x_2 \, A^{(2)T})$, that was computed as shown at 612 in the iteration (n=3) may be reused. In general, the computations in region 614 represent intermediate tensors that were computed in the immediately prior and/or other prior iterations, and that may be reused during the current iteration.

Figure 7:
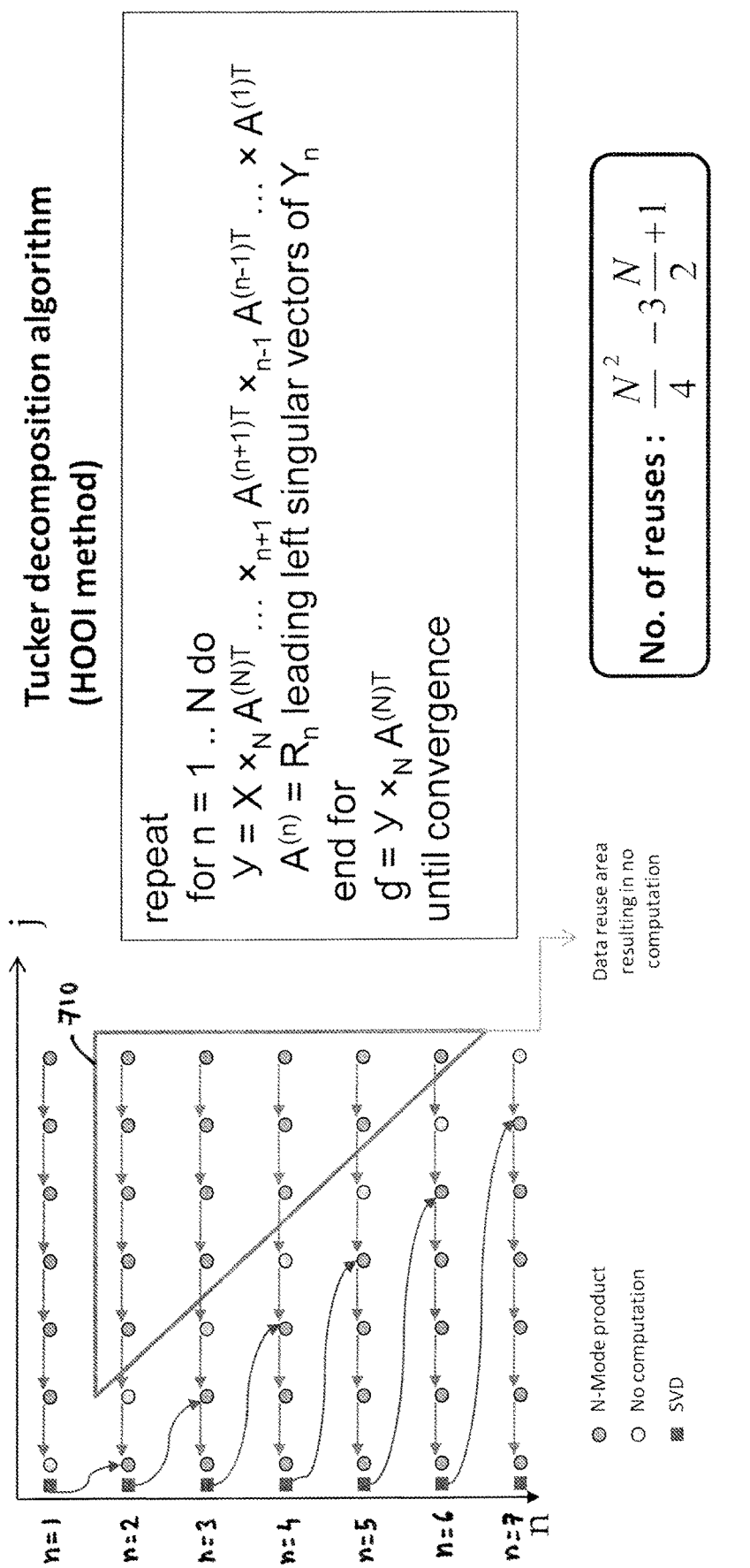
FIG. 7 schematically depicts computations in a modified higher-order orthogonal iteration (HOOI) method for computing the Tucker decomposition of a tensor, and corresponding indications of potential data reuse and computation avoidance, according to one embodiment.

With reference to FIG. 7, we present a modified algorithm that performs the "all but one n-Mode matrix product sequence" rewritten in a way that performs the sequence of n-Mode matrix products in a reverse order compared to that in the algorithm depicted in FIG. 6. The modified all but one n-Mode matrix product sequence can be written as follows:

$$Y = X \, x_N \, A^{(N)T} \, x_{N-1} \ldots x_{i+1} \, A^{(i+1)T} \, x_{n-1} \, A^{(n-1)T} \ldots x_1 \, A^{(1)T}$$

The modified algorithm is equivalent to the original algorithm in terms of semantic correctness of the computation and the number of potential data reuses that can be exploited. The number of n-Mode matrix product computations that can be avoided by reusing previously computed intermediate tensor data is $(N^2/4)-(3N/2)+1$, according to both the original and modified HOOI algorithms. In general in the modified algorithm, the computations in region 710 represent intermediate tensors that were computed in the immediately prior and/or other prior iterations, and that may be reused during the current iteration.

Figure 8:
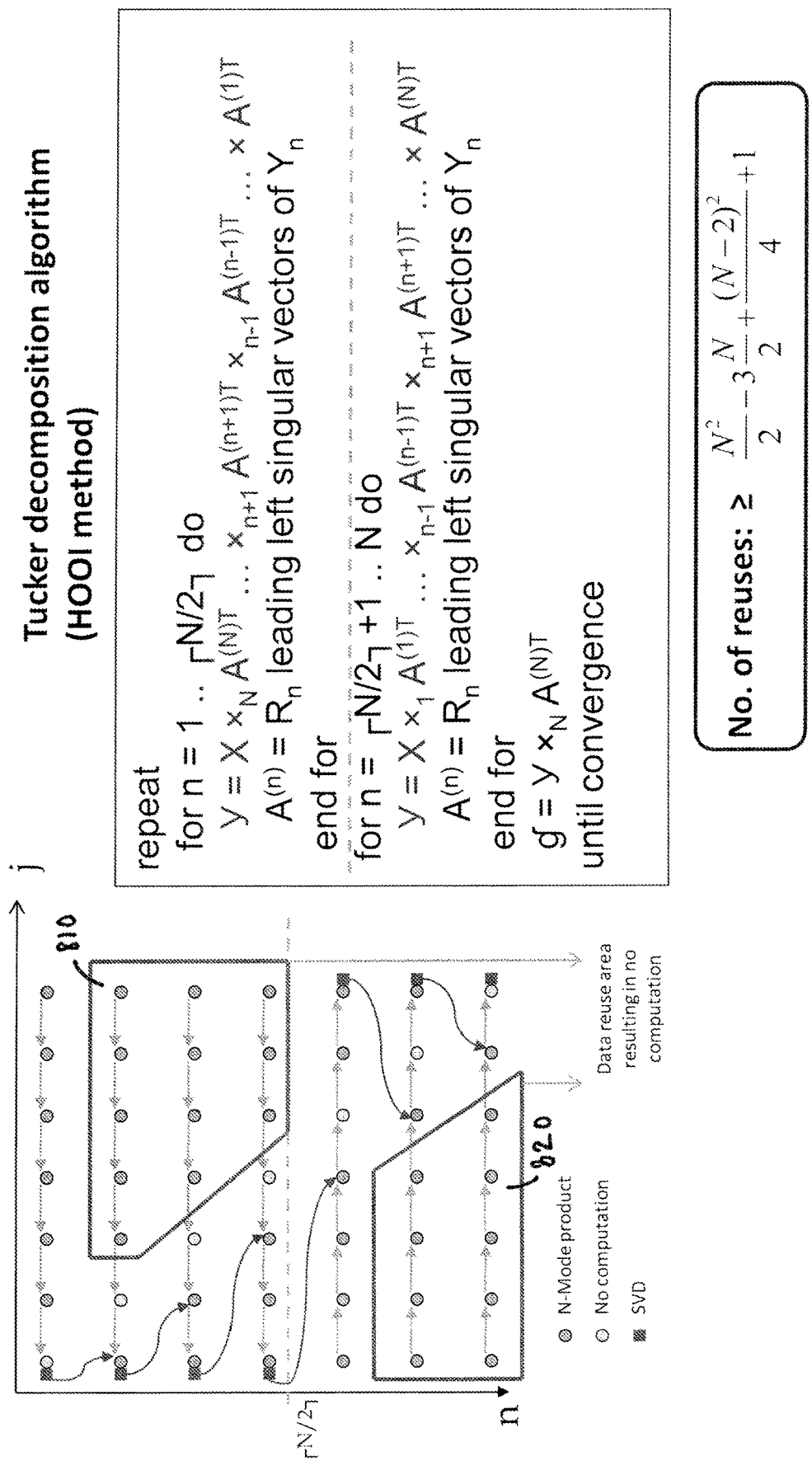
FIG. 8 schematically depicts computations in a further modified higher-order orthogonal iteration (HOOI) method for computing the Tucker decomposition of a tensor, and corresponding indications of potential data reuse and computation avoidance, according to one embodiment.

With reference to FIG. 8, we present an approach to potentially further increase the number of n-Mode matrix product computations that can be avoided by reusing previously computed intermediate tensor data. In this embodiment, the computation loop over different modes of the tensor is split into two halves, one half performing the original "n-Mode matrix product sequence" operation in each iteration and the other half performing the reverse "n-Mode matrix product sequence" in each iteration. According to this improvement, the number of reuses can be greater than or equal to $(N^2/4)-(3N/2)+((N-2)^2/4)+1$. It is achieved, in part, by reorganizing the computations of the original algorithm (presented in FIG. 6) taking advantage of the fact that for distinct modes in a sequence of n-Mode matrix products, the order of multiplication is irrelevant. Our approach does the following modification to the algorithm. The "for" loop goes over the modes of the tensor in a particular order and let us assume that the modes are numbered from 1 to N in that order. We split the "for" loop into two halves. In the first half, the "all but one n-Mode matrix product sequence" is performed in the decreasing (reverse) order of modes and in the second half, the "all but one n-Mode matrix product sequence" is performed in the increasing (original) order. By doing so, the number of reuses of the intermediate tensors produced is increased.

For example, intermediate results/tensors in region 810 may be reused in the first half of the iterations. This is an improvement over the algorithm depicted in FIG. 6, in which relatively fewer intermediate results are available for reuse during the first half of iterations, e.g., corresponding to iterations n=1 through n=4, if the number of iterations N is 7. The intermediate results/tensors in region 820 may be reused in the second half of the iterations. This is an improvement over the algorithm depicted in FIG. 7, in which relatively fewer intermediate results are available for reuse during the second half of iterations, e.g., corresponding to iterations n=5 through n=7, if the number of iterations N is 7. It should be understood that the total number of iterations N=7 is illustrative only. The number of modes, also 7, is also illustrative only. In general, the number of iterations can be fewer or more, e.g., 10, 15, 18, 25, etc., and the number of modes of the tensor is greater than two.

In some embodiments, we provide a memory-efficient technique to handle large-scale sparse tensor computations. Despite the popularity of Tucker decomposition, applying it on a large-scale sparse tensor is known to cause a memory blowup problem. Specifically, even if enough memory is available to store the large input sparse tensor and the core output dense tensor, memory overflow occurs frequently in Tucker computation due to the need to store larger intermediate results.

The computation of all but one n-Mode matrix product sequence introduces the possibility of memory blowup. Let us assume that the input tensor size is $I_1 \times \ldots \times I_N$ and the output tensor size is $R_1 \times \ldots \times R_N$. The sizes $I_1 \ldots I_N$ are typically very large (e.g., on the order of thousands, millions, tens of millions, etc.) and the sizes $R_1 \ldots R_N$ are smaller (e.g., on the order of tens, hundreds, thousands, etc.). Many conventional sparse tensor dense matrix product implementations typically store the n-Mode matrix product result in a dense tensor. As such, in the all but one sequence computation (for any mode other than one), the result of the first n-Mode matrix product may to be stored in a large dense tensor of size $R_1 \times I_2 \times \ldots \times I_N$. The need to store even one or several of such intermediate results can lead to memory overflow resulting in the intermediate memory blowup problem.

Many of the intermediate results, however, do not produce a dense tensor. An intermediate tensor resulting from an "all but one n-Mode matrix product sequence" is typically a semi-sparse tensor. In other words, these product sequences often produce completely sparse tensors or sparse tensors that have dense sub-tensors or one or more dense modes. Various embodiments that use the novel sparse formats (both mode-generic and mode-specific) described above can efficiently store both completely sparse tensors and tensors that have dense sub-tensors and/or a dense mode. Taking advantage of this typical property of the "all but one n-Mode matrix product sequence," in one embodiment, the intermediate memory blowup problem is avoided or mitigated by using a mode-generic format for storing one or more of the intermediate results. In another embodiment, a mode-specific format is used to store one or more of the intermediate results, and in yet another embodiment a mode-generic format is used to store one or more intermediate results and a mode-specific format is used to store one or more other intermediate results.

The mode-generic format is beneficial if the intermediate tensor includes a dense mode, and the mode-specific format is beneficial if the intermediate tensor lacks a dense mode. Both formats can be used to store any type of tensor, however. In general embodiments that use mode-generic and/or mode-specific sparse formats to store one or more intermediate tensors can reduce the overall memory requirement. This typically: (1) reduces the possibility of memory blowup, and (2) provides opportunity to store more intermediate tensors and achieve more data reuse.

Figure 9:
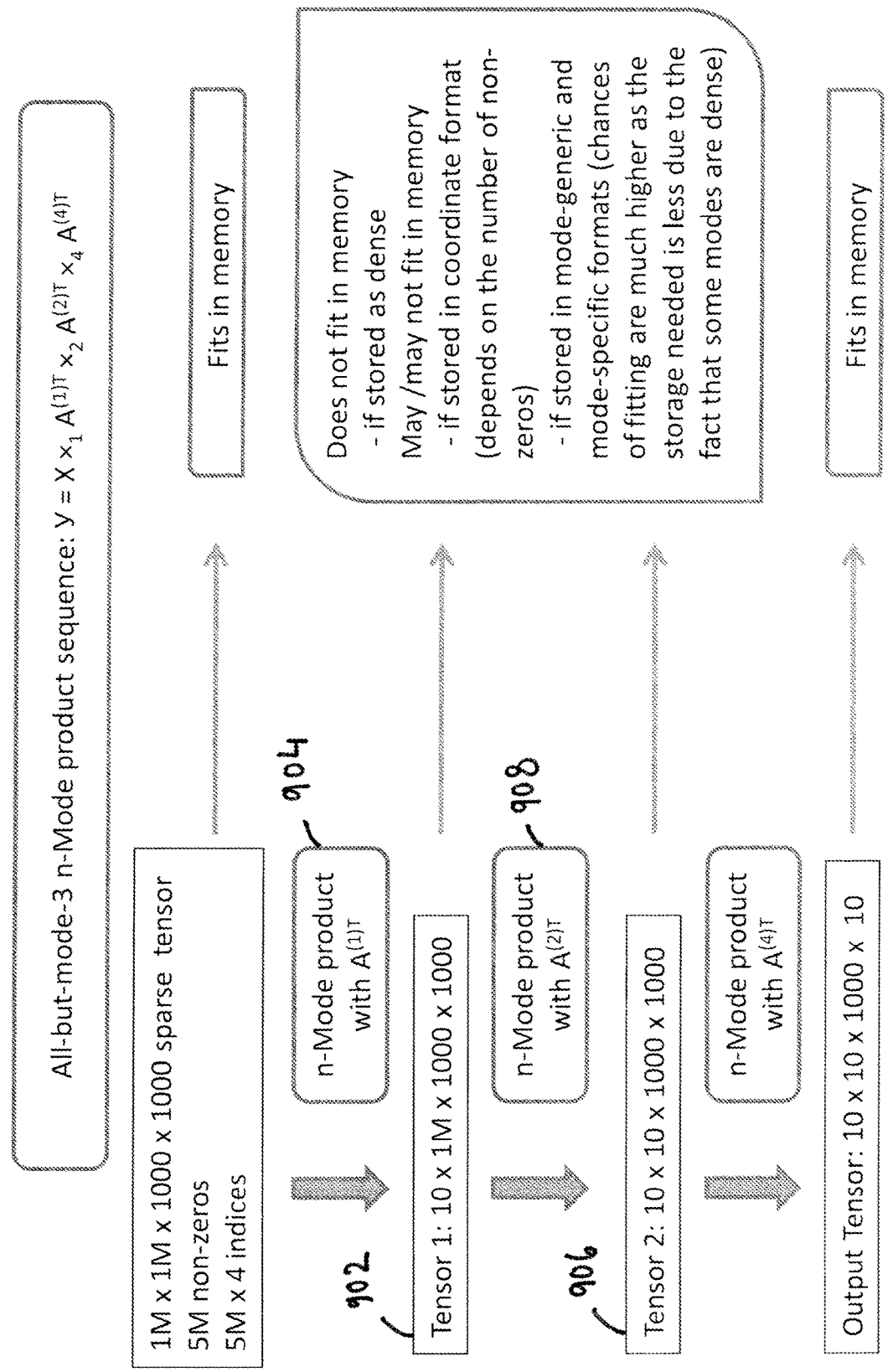
FIG. 9 illustrates a memory blowup problem in Tucker decomposition in the "all but one n-Mode matrix product sequence" operation, according to one embodiment.

With reference to FIG. 9, another solution is described to address the memory blowup problem. Some embodiments provide this other solution independently, while in some embodiments, the use of this other solution is combined with the previous solution, i.e., the use of mode-generic and/or mode-specific formats to store one or more of the intermediate tensors.

In general, there are N−2 intermediate tensors associated with each iteration of a N-th order tensor Tucker decomposition. Typically the size of the first intermediate tensor 902 (resulting from the first n-Mode matrix product 904 in the sequence) is larger than that of the second intermediate tensor 906 (resulting from the second n-Mode matrix product 908 in the sequence) and so on. It should be understood, however, that in some instances, the size of the intermediate tensors does not decrease with the sequence of products, and embodiments in which the size may increase and/or decrease in a random order are within the scope of the present invention.

In one embodiment, the input tensor X and the output tensor, produced during the last iteration, fit in the memory. The first intermediate tensor 902 does not fit in the available memory if stored in the conventional dense format. In some embodiments, the first intermediate tensor does not fit in the memory even if it is stored in the conventional coordinate format, but the likelihood that the tensor 902 would fit in the memory can increase significantly if a mode-generic or a mode-specific format is used to store the first intermediate tensor 902. Similarly, the intermediate tensors 908 and other intermediate tensors may or may not fit in the available memory depending on the formats used to store each of these intermediate tensors. Whether an intermediate tensor would fit in memory can also depend on which other tensors have already been stored or are designated to be stored in the memory.

It is possible to compute the entire all but one n-Mode matrix product sequence without storing any of the intermediate tensors. However such a computation induces a huge overhead in terms of repeated computation of various intermediate values that would have been otherwise computed only once, if they were stored and used for computing the next product in the sequence. As such, a tradeoff exists between performing redundant computations and using more memory for storing intermediate results.

Some techniques to perform the above-described tradeoff divide the modes of the tensor as element-wise and standard. (See, e.g., T. G. Kolda and J. Sun, "Scalable Tensor Decompositions for Multiaspect Data Mining," in ICDM 2008: Proceedings of the 8th IEEE International Conference on Data Mining, December 2008, pp. 363-372). These tradeoffs are based on a reduction ratio based on sizes of the operand and resulting tensors of the product sequence. Importantly, these tradeoffs are limited to product sequence within a single iteration of tensor computations (e.g., one iteration of the Tucker decomposition).

In one embodiment, we order the modes of the tensor based on a degree of data reuse of the intermediate tensor resulting after a single n-Mode matrix product along the mode and/or after a sequence n-Mode matrix products along less than N−1 modes, N being the number of modes of the tensor. Let L be the list of modes in the order they are accessed in the original HOOI method, as depicted in FIG. 6. In one embodiment employing the modified HOOI method described with reference to FIG. 8, in selecting element-wise modes for the first half of the iterations, we choose the reverse order of L and choose minimal number of modes in that order that guarantees memory availability, as element-wise. The memory availability can be guaranteed by computing the total storage requirement for the intermediate tensors to be stored, and by comparing that requirement with a preselected threshold. The preselected threshold can be the size of total memory accessible to the processor. When the element-wise modes are identified, the remaining modes are designated as "standard," i.e., for single n-Mode matrix products or a sequence of less than N−1 matrix products associated with the designated standard modes, the intermediate results are stored in memory for subsequent reuse thereof. For the second half computation, the same process is repeated but with the original order of L.

When a set of modes is selected as element-wise, we perform the sequence of n-Mode matrix products along the element-wise modes at once (performing redundant computations and without storing the intermediate tensors) and store one intermediate tensor at the end of the "element-wise" computation. This intermediate tensor has the same number of modes as the input tensor but reduced in size along the element-wise modes. The intermediate tensor stored at the end of element-wise computation and/or other intermediate tensors stored after the standard-mode computations are available for reuse during a subsequent iteration. Thus, this approach can ensure memory availability to store intermediate tensors and also does not perturb the benefit of data reuse optimization illustrated with reference to FIGS. 6-8. As such, various embodiments employing one or more of these techniques not only address memory scalability but also improve computation time by reducing redundant computations through improved data reuse.

The selection of standard and element-wise modes can be based on, additionally or in the alternative, a degree of reuse of the intermediate tensor. For example, consider:

$$Y = X \times A1 \times A2 \times A4.$$

This can be computed as:

$$y1 = X \times A1; \; y2 = y1 \times A2; \text{ and } Y = y2 \times A4, \text{ or as} \quad (1)$$

$$y2 = X \times A1 \times A2; \text{ and } Y = y2 \times A4, \text{ or as} \quad (2)$$

$$z1 = X \times A2; \; y2 = z1 \times A1; \text{ and } Y = y2 \times A4, \text{ or as} \quad (3)$$

$$z2 = X \times A2 \times A4; \text{ and } Y = z2 \times A1. \quad (4)$$

Other combinations are also possible.

The reduction ratio based method selects the best combination from the combinations (1)-(4) (and from other possible combinations) by selecting the ordering or sequence that is most memory efficient. For example, if the combination (1) is selected, intermediate tensors y1 and y2 would be stored and reused, and resulting tensor Y is also stored. In the alternative, if the combination (2) is selected, only the intermediate tensor y2 is stored and reused, and resulting tensor Y is also stored. So the combination (2) has less reuse and more duplicate computations relative to the combination (1), but less storage requirement relative to the combination (1).

In the selection technique based on the degree of reuse, the intermediate tensor or tensors that are to be computed and stored are identified based on, at least in part, (a) the required storage, and (b) the degree of reuse of those tensors in the next iterations. For example, even if the combination (2) has less storage requirement relative to the combination (1), the combination (1) may be desired (if feasible), if y1 has a greater degree of reuse in subsequent iterations compared to y2. Comparing the combinations (1) and (4), the combination (4) may be selected over the combination (1) if memory requirements and degree of reuse of z2 (considered together) outweigh the same characteristics of y1 and y2.

In general, references to operations such as multiply, add, subtract, and values such as zero, and non-zero, for the elements of tensors may be understood to refer to appropriate implementations where these operators and elements correspond to operators, elements, and identity elements generally over algebraic rings, semi-rings, or abelian rings, or their approximations, for example, algebras over integers, rationals, reals, complex numbers, digital floating point representations, and including min-plus algebras over numbers and symbolic operators and strings. It should also be understood that in illustrating the features and benefits of various embodiments, Tucker decomposition is used only as an example of an iterative tensor computation. Various embodiments described herein can be used to improve performance and/or memory usage of several types of tensor operations such as those involving matrix operations on a tensor.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for incorporating data reuse in a tensor transform, the tensor having a plurality of modes, the number of modes being N, N being at least equal to three, the tensor transform comprising a plurality of iterations, the method comprising:
   performing by the processor a first iteration comprising a first sequence of n-mode matrix product operations on the tensor to obtain a first intermediate result, each n-mode matrix product comprising a product of a matrix and the tensor along a respective mode identified by a mode index denoted n, wherein $1 \leq n \leq 1V$, the first intermediate result comprising a first intermediate-tensor;
   at least one of: (i) selecting an order of modes for the first sequence by identifying a minimum number of element-wise modes, wherein the first sequence comprises all n-mode matrix product operations corresponding to all of the identified element-wise modes, to guarantee memory availability for all intermediate tensors resulting from the first iteration; and (ii) selecting a tensor format from one of mode-generic format and mode-specific format, wherein the selected format avoids memory blow up in storing intermediate results;
   storing by the processor the first intermediate tensor in memory;
   performing by the processor a second iteration representing a second sequence of n-mode matrix product operations using the first intermediate tensor accessed from the memory; and
   avoiding an n-mode matrix product operation that is part of both the first and second sequences, and is represented by the first intermediate tensor.

2. The method of claim 1, wherein the second operation uses an operand computed during the first iteration.

3. The method of claim 2, wherein the operand comprises a matrix.

4. The method of claim 1, wherein each iteration in the plurality of iterations comprises a sequence of operations, the method further comprising:
   ordering by the processor the sequence of operations in each iteration according to one of increasing order and decreasing order of modes of the tensor.

5. The method of claim 1, wherein each iteration in the plurality of iterations comprises a sequence of operations, the method further comprising:
   ordering by the processor the sequence of operations in each iteration in a first set of iterations in the plurality of iterations according to increasing order of modes of the tensor; and
   ordering by the processor the sequence of operations in each iteration in a second set of iterations in the plurality of iterations according to decreasing order of modes of the tensor.

6. The method of claim 1, wherein:
   storing the first intermediate result comprising the first intermediate tensor comprises storing in the memory elements of the first intermediate tensor in a mode-based order for improving locality of references when the elements of the first intermediate tensor are accessed during an operation on the first intermediate tensor.

7. The method of claim 6, wherein:
   storing the elements of the first intermediate tensor in the mode-based order comprises storing in the memory:
   a first data structure comprising a plurality of sparse mode index tuples associated with the first intermediate tensor; and
   a second data structure comprising a plurality of significant values in the first intermediate tensor, each significant value corresponding to a sparse mode index tuple in the first data structure.

8. The method of claim 1, further comprising:
   identifying by the processor a set of reusable tensors to be computed during a plurality of iterations;
   evaluating by the processor, for each reusable tensor in the set, a memory storage requirement; and
   selecting by the processor, a subset of reusable tensors from the set such that a total memory storage memory requirement for all of the reusable tensors in the subset does not exceed a preselected threshold.

9. The method of claim 8, wherein the set of reusable tensors comprises all reusable tensors to be computed during the plurality of iterations.

10. The method of claim 8, wherein:
    the evaluation comprises, for each reusable tensor in the set, determining a degree of reuse of the reusable tensor; and
    the selection is further based on, at least in part, the degree of reuse of each reusable tensor in the set.

11. The method of claim 8, wherein at least one iteration in the plurality of iterations comprises a sequence of operations, each operation corresponding to a mode of the tensor, the method further comprising:
performing a first group of operations in element-wise mode; and
performing a second mode of operation in standard mode.

12. The method of claim 8, wherein:
evaluating the memory storage requirement for each reusable tensor comprises determining a memory size required to store the reusable tensor by storing in the memory elements of the reusable tensor in a mode-based order for improving locality of references when the elements of the reusable tensor are accessed during an operation on the reusable tensor.

13. A system for incorporating data reuse in a tensor transform, the tensor having a plurality of modes, the number of modes being N, N being at least equal to three, the tensor transform comprising a plurality of iterations, the system comprising:
a memory;
a processor in electronic communication with the memory, wherein the processor is configured to:
perform a first iteration comprising a first sequence of n-mode matrix product operations on the tensor to obtain a first intermediate result, each n-mode matrix product comprising a product of a matrix and the tensor along a respective mode identified by a mode index denoted n, wherein 1≤n≤1V, the first intermediate result comprising a first intermediate-tensor;
at least one of: (i) select an order of modes for the first sequence by identifying a minimum number of element-wise modes, wherein the first sequence comprises all n-mode matrix product operations corresponding to all of the identified element-wise modes, to guarantee memory availability for all intermediate tensors resulting from the first iteration; and (ii) select a tensor format from one of mode-generic format and mode-specific format, wherein the selected format avoids memory blow up in storing intermediate results;
store the first intermediate tensor in memory;
perform a second iteration representing a second sequence of n-mode matrix product operations using the first intermediate tensor accessed from the memory; and
avoid an n-mode matrix product operation that is part of both the first and second sequences, and is represented by the first intermediate tensor.

14. The system of claim 13, wherein the second operation uses an operand computed during the first iteration.

15. The system of claim 14, wherein the operand comprises a matrix.

16. The system of claim 13, wherein each iteration in the plurality of iterations comprises a sequence of operations, and the processor is further configured to:
order the sequence of operations in each iteration according to one of increasing order and decreasing order of modes of the tensor.

17. The system of claim 13, wherein each iteration in the plurality of iterations comprises a sequence of operations, and the processor is further configured to:
order the sequence of operations in each iteration in a first set of iterations in the plurality of iterations according to increasing order of modes of the tensor; and
order the sequence of operations in each iteration in a second set of iterations in the plurality of iterations according to decreasing order of modes of the tensor.

18. The system of claim 13, wherein the processor is further configured to:
store in the memory elements of the first intermediate tensor in a mode-based order for improving locality of references when the elements of the first intermediate tensor are accessed during an operation on the first intermediate tensor.

19. The system of claim 18, wherein to store the elements of the first intermediate tensor in the mode-based order, the processor is further configured to store in the memory:
a first data structure comprising a plurality of sparse mode index tuples associated with the first intermediate tensor; and
a second data structure comprising a plurality of significant values in the first intermediate tensor, each significant value corresponding to a sparse mode index tuple in the first data structure.

20. The system of claim 13, wherein the processor is further configured to:
identify a set of reusable tensors to be computed during a plurality of iterations;
evaluate, for each reusable tensor in the set, a memory storage requirement; and
select a subset of reusable tensors from the set such that a total memory storage memory requirement for all of the reusable tensors in the subset does not exceed a preselected threshold.

21. The system of claim 20, wherein the set of reusable tensors comprises all reusable tensors to be computed during the plurality of iterations.

22. The system of claim 20, wherein:
to evaluate the memory storage requirement for each reusable tensor in the set, the processor is further configured to determine a degree of reuse of the reusable tensor; and
the selection is further based on, at least in part, the degree of reuse of each reusable tensor in the set.

23. The system of claim 20, wherein at least one iteration in the plurality of iterations comprises a sequence of operations, each operation corresponding to a mode of the tensor, and the processor is further configured to:
perform a first group of operations in element-wise mode; and
perform a second mode of operation in standard mode.

24. The system of claim 20, wherein:
to evaluate the memory storage requirement for each reusable tensor, the processor is further configured to determine a memory size required to store the reusable tensor by storing in the memory elements of the reusable tensor in a mode-based order for improving locality of references when the elements of the reusable tensor are accessed during an operation on the reusable tensor.

25. An article of manufacture, comprising a non-transitory machine-readable medium storing instructions that, when executed by a machine comprising a memory and a processor in electronic communication with the memory, configure the processor, for incorporating data reuse in a tensor transform, the tensor having a plurality of modes, the number of modes being N, N being at least equal to three, the tensor transform comprising a plurality of iterations, to:
perform a first iteration comprising a first sequence of n-mode matrix product operations on the tensor to obtain a first intermediate result, each n-mode matrix product comprising a product of a matrix and the tensor along a respective mode identified by a mode index denoted n, wherein 1≤n≤N, the first intermediate result comprising a first intermediate-tensor;

at least one of: (i) select an order of modes for the first sequence by identifying a minimum number of element-wise modes, wherein the first sequence comprises all n-mode matrix product operations corresponding to all of the identified element-wise modes, to guarantee memory availability for all intermediate tensors resulting from the first iteration; and (ii) select a tensor format from one of mode-generic format and mode-specific format, wherein the selected format avoids memory blow up in storing intermediate results;

store the first intermediate tensor in memory;

perform a second iteration representing a second sequence of n-mode matrix product operations using the first intermediate tensor accessed from the memory; and avoid an n-mode matrix product operation that is part of both the first and second sequences, and is represented by the first intermediate tensor.

26. The article of manufacture of claim 25, wherein the second operation uses an operand computed during the first iteration.

27. The article of manufacture of claim 26, wherein the operand comprises a matrix.

28. The article of manufacture of claim 25, wherein each iteration in the plurality of iterations comprises a sequence of operations, and the instructions further configure the processor to:

order the sequence of operations in each iteration according to one of increasing order and decreasing order of modes of the tensor.

29. The article of manufacture of claim 25, wherein each iteration in the plurality of iterations comprises a sequence of operations, and the instructions further configure the processor to:

order the sequence of operations in each iteration in a first set of iterations in the plurality of iterations according to increasing order of modes of the tensor; and order the sequence of operations in each iteration in a second set of iterations in the plurality of iterations according to decreasing order of modes of the tensor.

30. The article of manufacture of claim 25, wherein the instructions further configure the processor to:

store in the memory elements of the first intermediate tensor in a mode-based order for improving locality of references when the elements of the first intermediate tensor are accessed during an operation on the first intermediate tensor.

31. The article of manufacture of claim 30, wherein to store the elements of the first intermediate tensor in the mode-based order, the instructions further configure the processor to store in the memory:

a first data structure comprising a plurality of sparse mode index tuples associated with the first intermediate tensor; and a second data structure comprising a plurality of significant values in the first intermediate tensor, each significant value corresponding to a sparse mode index tuple in the first data structure.

32. The article of manufacture of claim 25, wherein the instructions further configure the processor to:

identify a set of reusable tensors to be computed during a plurality of iterations;

evaluate, for each reusable tensor in the set, a memory storage requirement; and select a subset of reusable tensors from the set such that a total memory storage memory requirement for all of the reusable tensors in the subset does not exceed a preselected threshold.

33. The article of manufacture of claim 32, wherein the set of reusable tensors comprises all reusable tensors to be computed during the plurality of iterations.

34. The article of manufacture of claim 32, wherein:

to evaluate the memory storage requirement for each reusable tensor in the set, the instructions further configure the processor to determine a degree of reuse of the reusable tensor; and the selection is further based on, at least in part, the degree of reuse of each reusable tensor in the set.

35. The article of manufacture of claim 32, wherein at least one iteration in the plurality of iterations comprises a sequence of operations, each operation corresponding to a mode of the tensor, and the instructions further configure the processor to:

perform a first group of operations in element-wise mode; and perform a second mode of operation in standard mode.

36. The article of manufacture of claim 32, wherein:

to evaluate the memory storage requirement for each reusable tensor, the instructions further configure the processor to determine a memory size required to store the reusable tensor by storing in the memory elements of the reusable tensor in a mode-based order for improving locality of references when the elements of the reusable tensor are accessed during an operation on the reusable tensor.

* * * * *